(12) United States Patent
Liu et al.

(10) Patent No.: US 7,656,654 B2
(45) Date of Patent: Feb. 2, 2010

(54) MOUNTING APPARATUS FOR STORAGE DEVICE

(75) Inventors: Chang-Chun Liu, Shenzhen (CN); Xiao-Lin Gan, Shenzhen (CN); Yu-Kuang Ho, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 89 days.

(21) Appl. No.: 11/967,021

(22) Filed: Dec. 29, 2007

(65) Prior Publication Data

US 2009/0091882 A1    Apr. 9, 2009

(30) Foreign Application Priority Data

Oct. 9, 2007    (CN) .......................... 2007 1 0201975

(51) Int. Cl.
*G06F 1/16* (2006.01)
(52) U.S. Cl. .............................. 361/679.33; 361/679.37
(58) Field of Classification Search ..............................
361/679.33–679.39
See application file for complete search history.

(56) References Cited

U.S. PATENT DOCUMENTS

| | | | | |
|---|---|---|---|---|
| 6,396,686 | B1 * | 5/2002 | Liu et al. | 361/679.33 |
| 6,728,109 | B1 * | 4/2004 | Wu | 361/747 |
| 7,038,907 | B2 * | 5/2006 | Chen | 361/679.33 |
| 7,259,959 | B2 * | 8/2007 | Tu et al. | 361/679.33 |
| 7,265,972 | B2 * | 9/2007 | Chien et al. | 361/679.33 |
| 7,369,403 | B2 * | 5/2008 | Chen et al. | 361/679.33 |
| 7,447,013 | B2 * | 11/2008 | Shi et al. | 361/679.33 |
| 2005/0041383 | A1 * | 2/2005 | Lo | 361/683 |
| 2006/0139871 | A1 * | 6/2006 | Chen et al. | 361/685 |
| 2007/0121285 | A1 * | 5/2007 | Liang et al. | 361/685 |
| 2007/0145866 | A1 * | 6/2007 | Huang et al. | 312/215 |
| 2007/0164170 | A1 * | 7/2007 | Huang et al. | 248/27.1 |
| 2007/0235625 | A1 * | 10/2007 | Liang et al. | 248/675 |
| 2007/0279860 | A1 * | 12/2007 | Zheng et al. | 361/685 |

* cited by examiner

*Primary Examiner*—Lisa Lea-Edmonds
(74) *Attorney, Agent, or Firm*—Frank R. Niranjan

(57) ABSTRACT

A mounting apparatus for a storage device includes a bracket configured for receiving the storage device and including a sidewall defining a through hole therein, a latching member pivotally mounted to the bracket and including a latching protrusion extending through the through hole of the bracket for fixing the storage device, a rotating mechanism connected between the bracket and the latching member to enable the latching member to rotate relative to the bracket, and an elastic member connected between the bracket and the latching member for urging the latching member toward the side wall of the bracket.

8 Claims, 4 Drawing Sheets

MOUNTING APPARATUS FOR STORAGE DEVICE

BACKGROUND

1. Field of the Invention

The present invention relates to mounting apparatuses, and more particularly to a mounting apparatus for a storage device.

2. Description of Related Art

An electronic apparatus, such as a typical desktop computer, a tower computer, a server, and the like, usually includes storage devices, such as hard disk drives, compact disk read-only memory (CD-ROM) drives, digital video disc (DVD) drives, floppy disk drives, and the like. These devices are typically added to increase the functionality of the electronic apparatus as desired by a user. However, the installation of such devices in the electronic apparatus is labor-intensive.

The installation of a hard disk drive in a computer typically involves the use of screws to attach the hard disk drive to a bracket of a computer chassis. However, these screws are usually too small and difficult to handle. Additionally, because of their small size, the screws are easily dropped, by an assembler, into the computer.

To address the aforementioned problems, a plurality of mounting apparatuses is invented to reduce the number of needed screws. For example, a pair of detachable rails is attached to opposite sides of a storage device with screws. The storage device is then slid into and secured to a drive bracket. However, the screws have to be removed to detach the rails from the storage device before replacing the storage device.

What is needed, therefore, is a mounting apparatus which facilitates convenient and secure mounting of a storage device in a bracket.

SUMMARY

An exemplary mounting apparatus for a storage device includes a bracket configured for receiving the storage device and including a sidewall defining a through hole therein, a latching member pivotally mounted to the bracket and including a latching protrusion extending through the through hole of the bracket for fixing the storage device, a rotating mechanism connected between the bracket and the latching member to enable the latching member to rotate relative to the bracket, and an elastic member connected between the bracket and the latching member for urging the latching member toward the side wall of the bracket.

Other advantages and novel features of the present invention will become more apparent from the following detailed description of an embodiment when taken in conjunction with the accompanying drawings, in which:

DETAILED DESCRIPTION

Figure 1:
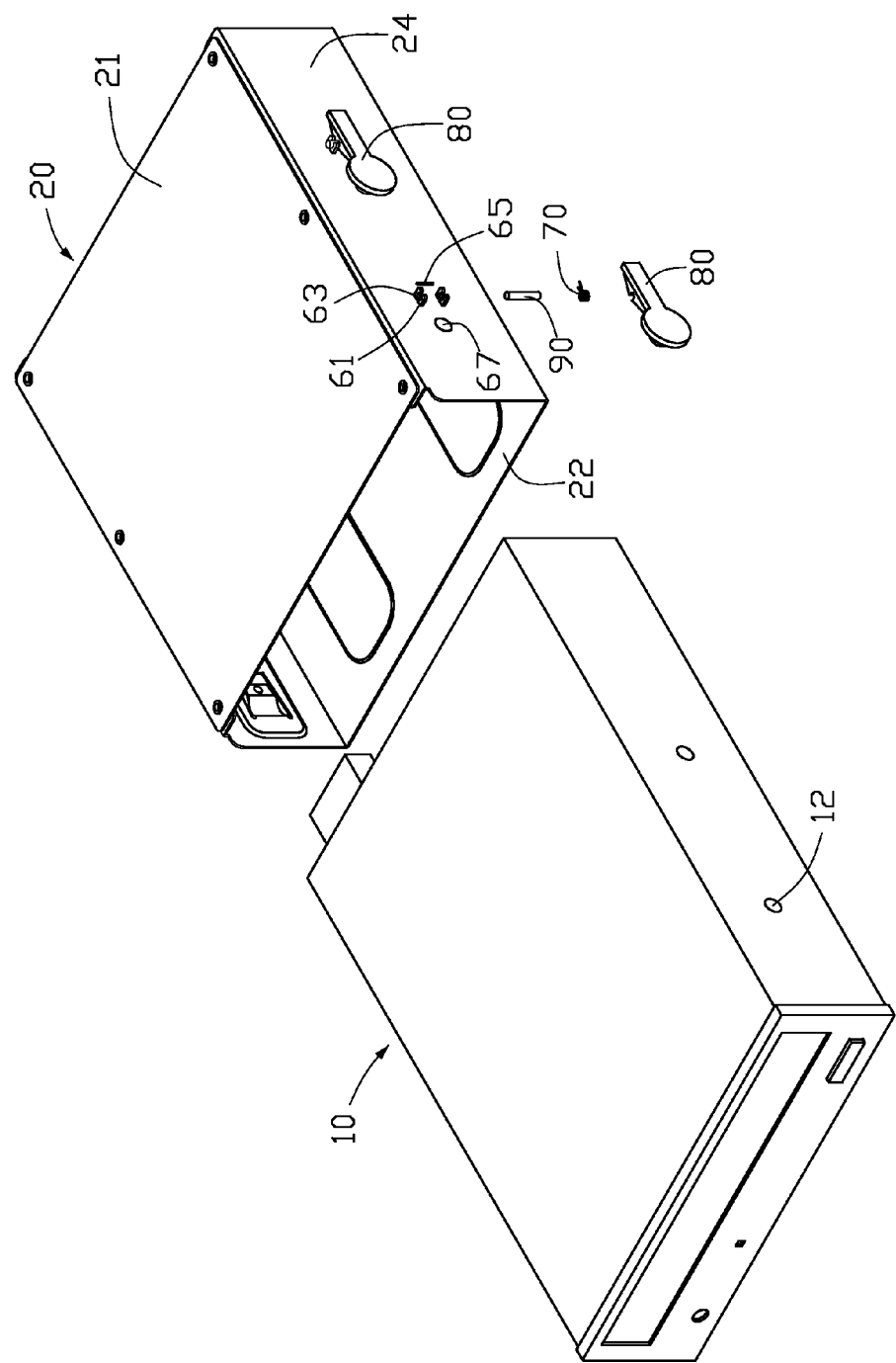
FIG. 1 is an exploded, isometric view of a mounting apparatus with a storage device in accordance with an embodiment of the present invention, the mounting apparatus including two latching members.

Referring to FIG. 1, a mounting apparatus for a storage device is provided in accordance with an embodiment of the present invention. The mounting apparatus is used for fixing a storage device 10 defining two spaced assembly holes 12, and includes a bracket 20 for receiving the storage device 10, and two fixing assemblies. Each fixing assembly includes a latching member 80, a shaft 90, and an elastic member. In this embodiment, the elastic member is a torsion spring 70.

The bracket 20 includes a top wall 21, a bottom wall 22, and a pair of sidewalls 24 connecting the top wall 21 to the bottom wall 22. Corresponding to each fixing assembly, one of the sidewalls 24 includes a pair of vertically spaced clipping tabs 61 extending therefrom, a blocking tab 65 extending therefrom and located at same sides of the clipping tabs 61, and a through hole 67 defined therein. A C-shaped groove 63 is defined in each clipping tab 61.

Figure 2:
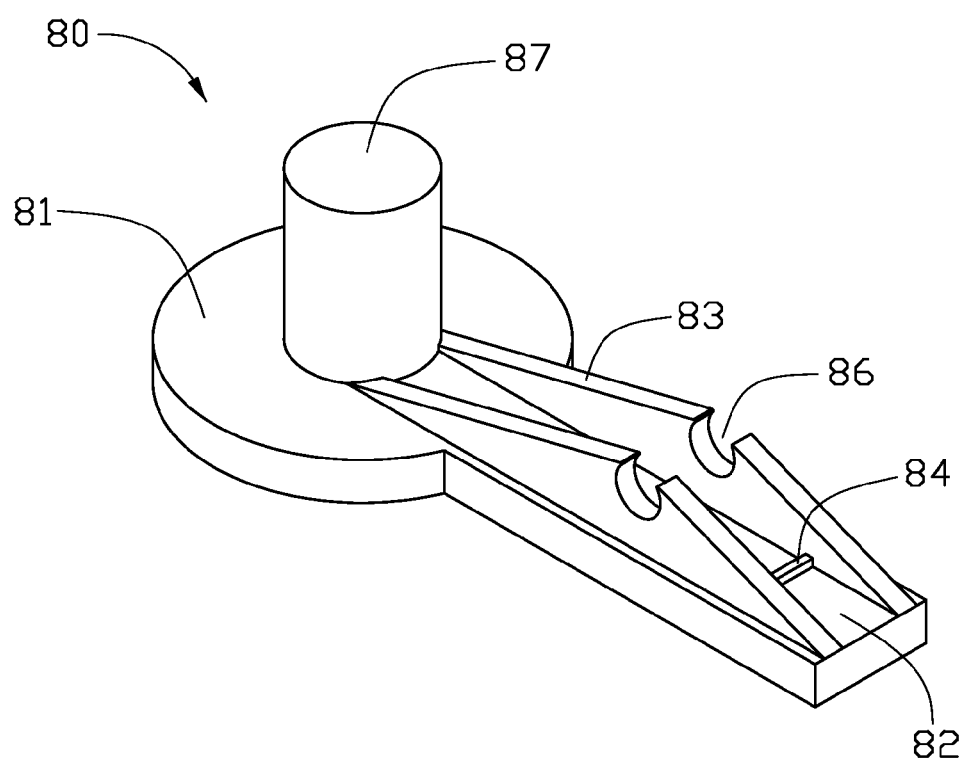
FIG. 2 is an enlarged isometric view of the latch member of FIG. 1, but viewed from another aspect.

Referring to FIG. 2, each latching member 80 includes a round-shaped plate 81, a beam 82 extending from a circumferential side of the plate 81, a latching protrusion 87 extending from a center of the plate 81, a pair of spaced triangular walls 83 extending from the beam 82 and joining with the latching protrusion 87, and a blocking tab 84 extending from the beam 82 between the walls 83. A C-shaped groove 86 is defined in the peak of each wall 83. A distance between the walls 83 is less than a distance between the clipping tabs 61 of the bracket 20.

Figure 3:
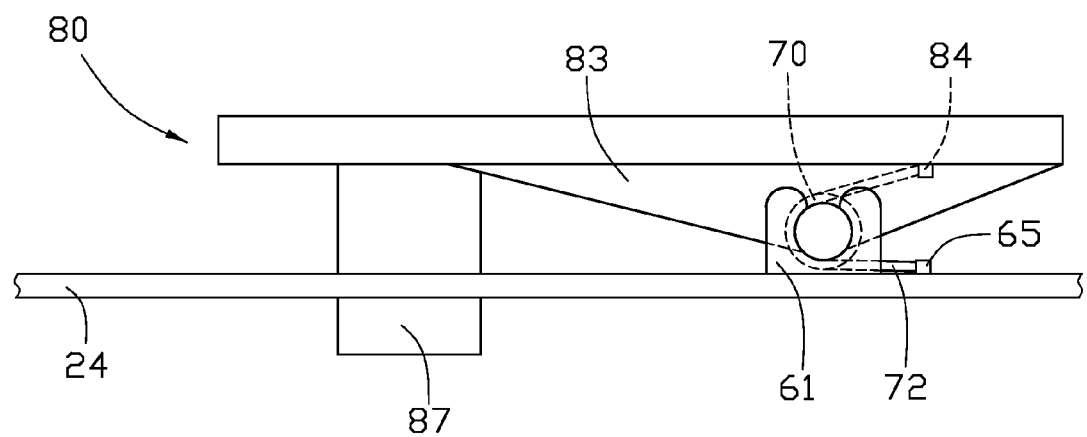
FIG. 3 is an assembled, partial, side elevational view of FIG. 1.

Referring to FIG. 3, the torsion spring 70 includes two legs respectively extending from ends thereof.

Figure 4:
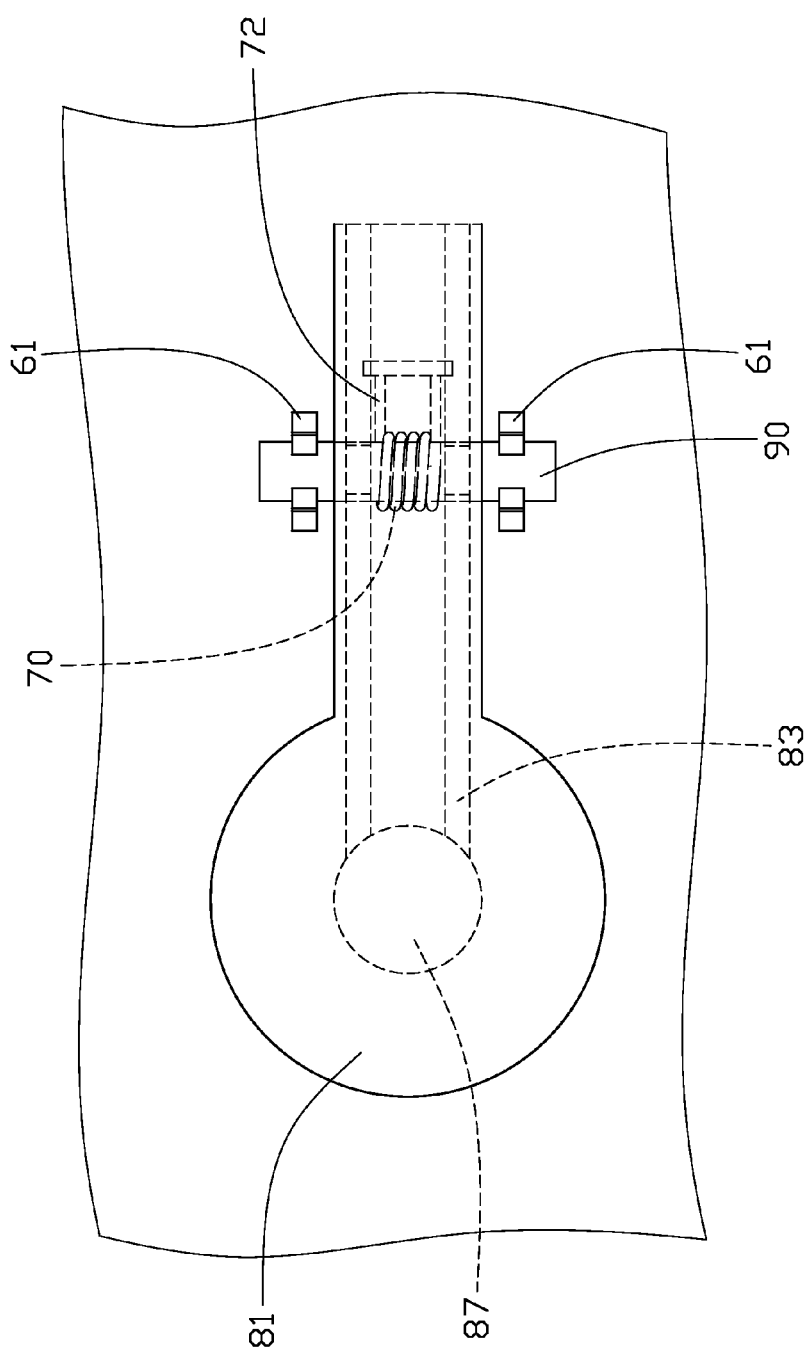
FIG. 4 is a top plan view of FIG. 3.

Referring also to FIG. 4, in assembly, only one of the fixing assemblies is shown and described hereinafter as an example. The torsion spring 70 is coiled around the shaft 90. The shaft 90 is snappingly received in the grooves 86 of the walls 83 of the latching member 80, and the torsion spring 70 is placed between the two walls 83. The latching protrusion 87 of the latching member 80 is generally aligned with the through the hole 67 of the bracket 20, the shaft 90 is snappingly received in the grooves 63 of clipping tabs 61 of the bracket 20, the two walls 83 of the latching member 80 are placed between the two tabs 61, and ends of the two legs 72 of the torsion spring 70 are respectively abutted against the blocking tab 65 of the bracket 20 and the blocking tab 84 of the latching member 80. Thus, the latching member 80 is rotatably mounted to the corresponding sidewall 24 of the bracket 20, the latching member 80 is rotated toward the sidewall 24 of the bracket 20 by the torsion spring 70 engaged between the latching member 80 and the sidewall 24, and a free end of the latching protrusion 87 of the latching member 80 is inserted in the bracket 20 through the hole 67. Moreover, in other embodiments, the distance between the two clipping tabs 61 of the bracket may be less than the distance between the two walls 83 of the latching member 80, and the torsion spring 70 is placed between the clipping tabs 61, and the two tabs 61 are placed between the two walls 83.

In use, the latching member 80 is rotated around the shaft 90 to make the latching protrusion 87 thereof to disengage from the through hole 67 of the bracket 20 by pressing a free end of the beam 82 or pulling the plate 81. The storage device 10 is inserted in the bracket 20, and the assembly hole 12 of the storage device 10 is aligned with the corresponding through hole 67 of the bracket 20. Releasing the latching member 80, the latching member 80 is rotated back by the torsion spring 70, and the free end of the latching protrusion 87 of the latching member 80 is inserted through the through hole 67 of the bracket 20 and inserted in the assembly hole 12 of the storage device 10. Thus, the storage device 10 is fixed in the bracket 20 by the latching member 80. To disassemble the storage device 10, the latching member 80 is rotated to disengage the latching protrusion 87 from the assembly hole 12 of the storage device 10, the storage device 10 can then be easily taken out from the bracket 20.

In other embodiments, the torsion spring 70 in the present embodiment may be replaced by an extension spring, the extension spring is placed between the latching protrusion 87 of the latching member 80 and the shaft 90, and one end of the extension spring is connected with the latching member 80 and the other end of the extension spring is connected with the corresponding sidewall 24 of the bracket 20. The torsion spring 70 may be replaced by a compression spring, the compression spring is placed between an free end of the beam 82 of the latching member 80 and the shaft 90, and one end of the compression spring is connected with the latching member 80 and the other end of the compression spring is connected with the corresponding sidewall 24 of the bracket 20. Moreover, a rotation mechanism made up of the shaft 90, the corresponding C-shaped grooves 63 of the bracket 20, and the C-shaped grooves 86 of the corresponding latching member may be shown in other forms. For example, the grooves 63 and/or 86 may be O-shaped; the shaft 90 may be replaced by a shaft having a smooth middle portion and two threaded segments adjacent two ends of the shaft, and correspondingly, the grooves 63 of the bracket 20 is replaced by screw holes corresponding to the screw threads of the shaft; one of the pair of clipping tabs 61 and the groove 63 thereof may be canceled; one of the pair of walls 83 and the groove 86 thereof may be canceled.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for a storage device, the mounting apparatus comprising:
    a bracket configured for receiving the storage device, the bracket comprising a sidewall defining a through hole therein;
    a latching member pivotally mounted to the bracket, the latching member comprising a latching protrusion extending through the through hole of the bracket for fixing the storage device;
    a rotating mechanism connected between the bracket and the latching member to enable the latching member to rotate relative to the bracket; and
    an elastic member connected between the bracket and the latching member for urging the latching member toward the side wall of the bracket;
    wherein the rotating mechanism comprises at least one assembly groove defined in the sidewall of the bracket, at least one assembly groove defined in the latching member, and a shaft engaged in the at least one assembly groove of the bracket and the at least one assembly groove of the latching member.

2. The mounting apparatus as claimed in claim 1, wherein two assembly grooves are defined in the sidewall of the bracket, and two assembly grooves are defined in the latching member.

3. The mounting apparatus as claimed in claim 2, wherein the sidewall of the bracket of the bracket comprises a pair of spaced clipping tabs extending therefrom, the two assembly grooves of the bracket are respectively defined in the pair of clipping tabs, the latching member comprises a pair of spaced walls extending therefrom, the two assembly grooves of the latching member are respectively defined in the pair of walls.

4. The mounting apparatus as claimed in claim 3, wherein the elastic member is a torsion spring having two legs respectively extending from ends thereof, the torsion spring is coiled around the shaft, the legs of the torsion spring are respectively abutted against the sidewall of the bracket and the latching member.

5. The mounting apparatus as claimed in claim 4, wherein the pair of walls of the latching member is placed between the pair of clipping tabs of the bracket, the torsion spring is place between the pair of walls of the latching member.

6. The mounting apparatus as claimed in claim 5, wherein the sidewall of the bracket comprises a blocking tab extending therefrom, the latching member comprises a blocking tab extending therefrom, the legs of the torsion spring are respectively abutted against the blocking tab of the bracket and the blocking tab of the latching member.

7. The mounting apparatus as claimed in claim 1, wherein the elastic member is a extension spring placed between the latching protrusion of the latching member and the rotating mechanism, ends of the extension spring are respectively connected with the latching member and the sidewall of the bracket.

8. The mounting apparatus as claimed in claim 1, wherein the elastic member is a compression spring placed between an end of the latching member far from the latching protrusion and the rotating mechanism, ends of the expression spring are respectively connected with the latching member and the sidewall of the bracket.

* * * * *